US006692871B2

United States Patent
Gan et al.

(10) Patent No.: US 6,692,871 B2
(45) Date of Patent: Feb. 17, 2004

(54) DOUBLE CURRENT COLLECTOR CATHODE DESIGN FOR ALKALI METAL ELECTROCHEMICAL CELLS HAVING SHORT CIRCUIT SAFETY CHARACTERISTICS

(75) Inventors: Hong Gan, East Amherst, NY (US); Esther S. Takeuchi, East Amherst, NY (US)

(73) Assignee: Wilson Greatbatch Ltd., Clarence, NY (US)

( * ) Notice: Subject to any disclaimer, the term of this patent is extended or adjusted under 35 U.S.C. 154(b) by 102 days.

(21) Appl. No.: 09/969,389

(22) Filed: Oct. 2, 2001

(65) Prior Publication Data

US 2002/0090551 A1 Jul. 11, 2002

Related U.S. Application Data

(60) Provisional application No. 60/249,688, filed on Nov. 17, 2000.

(51) Int. Cl.$^7$ ................................................ H01M 4/58
(52) U.S. Cl. .................... 429/218.1; 429/128; 429/219; 429/220; 429/221; 429/224; 429/231.1; 429/231.3; 429/231.5; 429/231.7; 429/231.95; 429/330; 429/332; 429/328; 429/329; 29/623.1
(58) Field of Search .............................. 429/218.1, 128, 429/219, 220, 221, 224, 231.1, 231.3, 231.5, 231.7, 231.95, 330, 332, 328, 329; 29/623.1

(56) References Cited

U.S. PATENT DOCUMENTS

| 5,811,206 A | * | 9/1998 | Sunderland et al. ......... 429/181 |
| 6,017,656 A | * | 1/2000 | Crespi et al. ................ 429/307 |
| 6,042,624 A | * | 3/2000 | Breyen et al. ............. 29/25.03 |
| 6,551,747 B1 | * | 4/2003 | Gan ........................... 429/245 |
| 2002/0012844 | * | 1/2002 | Gan et al. ................. 429/231.7 |

* cited by examiner

*Primary Examiner*—Laura Weiner
(74) *Attorney, Agent, or Firm*—Michael F. Scalise

(57) ABSTRACT

A new sandwich cathode design having a first cathode active material of a relatively low energy density but of a relatively high rate capability sandwiched between two current collectors and with a second cathode active material having a relatively high energy density but of a relatively low rate capability in contact with the opposite sides of the two current collectors, is described. The present cathode design is relatively safer under short circuit and abuse conditions than cells having a cathode active material of a relatively high rate density but a relatively low energy capability alone. A preferred cathode is: $CF_x$/current collector/SVO/current collector/$CF_x$. The SVO provides the discharge end of life indication since $CF_x$ and SVO cathode cells discharge under different voltage profiles. This is useful as an end-of-replacement indicator (ERI) for an implantable medical device, such as a cardiac pacemaker.

27 Claims, No Drawings

DOUBLE CURRENT COLLECTOR CATHODE DESIGN FOR ALKALI METAL ELECTROCHEMICAL CELLS HAVING SHORT CIRCUIT SAFETY CHARACTERISTICS

CROSS REFERENCE TO RELATED APPLICATION

This application claims priority based on provisional application Ser. No. 60/249,688, filed Nov. 17, 2000.

BACKGROUND OF THE INVENTION

1. Field of Invention

This invention relates to the conversion of chemical energy to electrical energy. In particular, the present invention relates to a new sandwich cathode design having a first cathode active material of a relatively low energy density but of a relatively high rate capability sandwiched between two current collectors and with a second cathode active material having a relatively high energy density but of a relatively low rate capability in contact with the opposite side of the current collectors. The present cathode design is useful in applications where a premium is places on increased energy density, such as in power sources associated with implantable medical devices, while providing relative safety under short circuit conditions.

2. Prior Art

The capacity of an electrochemical cell is not only dependent on the electrode assembly design and packing efficiency, it also is dependent on the type of active materials used. For example, it is generally recognized that for lithium cells, silver vanadium oxide (SVO) and, in particular, $\epsilon$-phase silver vanadium oxide ($AgV_2O_{5.5}$), is preferred as the cathode active material. This active material has a theoretical volumetric capacity of 1.37 Ah/ml. By comparison, the theoretical volumetric capacity of $CF_x$ material (x=1.1) is 2.42 Ah/ml, which is 1.77 times that of $\epsilon$-phase silver vanadium oxide.

An attempt to use high capacity materials, such as $CF_x$, by mixing it with a high rate cathode material, such as SVO, is reported in U.S. Pat. No. 5,180,642 to Weiss et. al. However, electrochemical cells made from such cathode composites have lower rate capability. Increasing the cell's theoretical capacity by using $CF_x$ as part of the cathode mix is in part canceled by lowering of its power capability in a high rate discharge application.

U.S. Pat. No. 5,614,331 to Takeuchi et al., which is assigned to the assignee of the present invention and incorporated hereby by reference, describes a method of using a medium rate $CF_x$ cell to power the circuitry of an implantable defibrillator while simultaneously using a SVO cell to provide the power supply under high rate application for the device. The advantage of this method is that all of the high power SVO energy is reserved for the high power application such as charging a capacitor while the device monitoring function, for example for monitoring the heart beat, which require generally low power requirements, is provided by the high capacity $CF_x$ system. However, this battery construction requires a very careful design to balance the capacities of the high power cell (SVO) and the low power cell ($CF_x$) with both cells reaching end of service life at or near the same time. Such a balance, nevertheless, is very difficult to achieve due to the variable device usage requirements of a particular patient.

SUMMARY OF THE INVENTION

Accordingly, the present invention is directed to improvements in the performance of lithium electrochemical cells by providing a new concept in electrode design. The new electrode configuration is especially useful in applications where increased energy density is desired while providing relative safety under short circuit conditions. Also, the cell has a predictable end of life, which is useful for scheduling cell replacement procedures, such as in implantable medical device applications.

To fulfil these needs, a new sandwich cathode design is provided having a first cathode active material of a relatively low energy density but of a relatively high rate capability, for example SVO, sandwiched between two current collectors and with a second cathode active material having a relatively high energy density but of a relatively low rate capability, for example $CF_x$, in contact with the opposite sides of the current collectors. Such an exemplary cathode design might look like: $CF_x$/current collector/SVO/current collector/$CF_x$.

These and other objects of the present invention will become increasingly more apparent to those skilled in the art by reference to the following description.

DETAILED DESCRIPTION OF THE PREFERRED EMBODIMENTS

An electrochemical cell according to the present invention comprises an anode of a metal selected from Groups IA, IIA and IIIB of the Periodic Table of the Elements. Such anode active materials include lithium, sodium, potassium, etc., and their alloys and intermetallic compounds including, for example, Li—Si, Li—Al, Li—B, Li—Mg, and Li—Si—B alloys and intermetallic compounds. The preferred anode comprises lithium. An alternate anode comprises a lithium alloy such as a lithium-aluminum alloy. The greater the amount of aluminum present by weight in the alloy, however, the lower the energy density of the cell.

The form of the anode may vary, but preferably the anode is a thin metal sheet or foil of the anode metal, pressed or rolled on a metallic anode current collector, i.e., preferably comprising titanium, titanium alloy or nickel, to form an anode component. Copper, tungsten and tantalum are also suitable materials for the anode current collector. In the exemplary cell of the present invention, the anode component has an extended tab or lead of the same material as the anode current collector, i.e., preferably nickel or titanium, integrally formed therewith such as by welding and contacted by a weld to a cell case of conductive metal in a case-negative electrical configuration. Alternatively, the anode may be formed in some other geometry, such as a bobbin shape, cylinder or pellet to allow an alternate low surface cell design.

The electrochemical cell of the present invention further comprises a cathode of electrically conductive material which serves as the other electrode of the cell. The cathode is preferably of solid materials and the electrochemical reaction at the cathode involves conversion of ions which migrate from the anode to the cathode into atomic or molecular forms. The solid cathode may comprise a first active material of a carbonaceous chemistry and a second active material of a metal element, a metal oxide, a mixed metal oxide and a metal sulfide, and combinations thereof. The metal oxide, the mixed metal oxide and the metal sulfide of the second active material have a relatively lower energy density but a relatively higher rate capability than the first carbonaceous active material.

More particularly, the first active material is of a relatively high energy density and a relatively low rate capability in comparison to the second cathode active material. The first active material is preferably a carbonaceous compound prepared from carbon and fluorine, which includes graphitic and nongraphitic forms of carbon, such as coke, charcoal or activated carbon. Fluorinated carbon is represented by the formula $(CF_x)_n$ wherein x varies between about 0.1 to 1.9 and preferably between about 0.5 and 1.2, and $(C_2F)_n$ wherein n refers to the number of monomer units which can vary widely.

The sandwich cathode design of the present invention further includes a second active material formed by the chemical addition, reaction, or otherwise intimate contact of various metal oxides, metal sulfides and/or metal elements, preferably during thermal treatment, sol-gel formation, chemical vapor deposition or hydrothermal synthesis in mixed states. The active materials thereby produced contain metals, oxides and sulfides of Groups IB, IIB, IIIB, IVB, VB, VIB, VIIB and VIII, which includes the noble metals and/or other oxide and sulfide compounds. A preferred second cathode active material is a reaction product of at least silver and vanadium.

One preferred mixed metal oxide is a transition metal oxide having the general formula $SM_xV_2O_y$ where SM is a metal selected from Groups IB to VIIB and VIII of the Periodic Table of Elements, and wherein x is about 0.30 to 2.0 and y is about 4.5 to 6.0 in the general formula. By way of illustration, and in no way intended to be limiting, one exemplary cathode active material comprises silver vanadium oxide having the general formula $Ag_xV_2O_y$ in any one of its many phases, i.e., β-phase silver vanadium oxide having in the general formula x=0.35 and y=5.8, γ-phase silver vanadium oxide having in the general formula x=0.80 and y=5.40 and ε-phase silver vanadium oxide having in the general formula x=1.0 and y=5.5, and combination and mixtures of phases thereof. For a more detailed description of such cathode active materials reference is made to U.S. Pat. No. 4,310,609 to Liang et al., which is assigned to the assignee of the present invention and incorporated herein by reference.

Another preferred composite transition metal oxide cathode material includes $V_2O_z$ wherein $z \leq 5$ combined with $Ag_2O$ having silver in either the silver (II), silver (I) or silver (0) oxidation state and CuO with copper in either the copper (II), copper (I) or copper (0) oxidation state to provide the mixed metal oxide having the general formula $Cu_xAg_yV_2O_z$, (CSVO). Thus, the composite cathode active material may be described as a metal oxide-metal oxide-metal oxide, a metal-metal oxide-metal oxide, or a metal-metal-metal oxide and the range of material compositions found for $Cu_xAg_yV_2O_z$ is preferably about $0.01 \leq z \leq 6.5$. Typical forms of CSVO are $Cu_{0.16}Ag_{0.67}V_2O_z$ with z being about 5.5 and $CuO_5Ag_{0.5}V_2O_z$ with z being about 5.75. The oxygen content is designated by z since the exact stoichiometric proportion of oxygen in CSVO can vary depending on whether the cathode material is prepared in an oxidizing atmosphere such as air or oxygen, or in an inert atmosphere such as argon, nitrogen and helium. For a more detailed description of this cathode active material reference is made to U.S. Pat. No. 5,472,810 to Takeuchi et al. and U.S. Pat. No. 5,516,340 to Takeuchi et al., both of which are assigned to the assignee of the present invention and incorporated herein by reference.

In a broader sense, it is contemplated by the scope of the present invention that the first active material of the present sandwich cathode design is any material which has a relatively higher energy density but a relatively lower rate capability than the second active material. In addition to fluorinated carbon, $Ag_2O$, $Ag_2O_2$, $CuF_2$, $Ag_2CrO_4$, $MnO_2$ and even SVO itself are useful as the first active material, and in addition to silver vanadium oxide and copper silver vanadium oxide, $V_2O_5$, $MnO_2$, $LiCoO_2$, $LiNiO_2$, $LiMn_2O_4$, $TiS_2$, $CU_2S$, FeS, $FeS_2$, copper oxide, copper vanadium oxide, and mixtures thereof are useful as the second active material.

The true density and theoretical volumetric capacities of several active materials are listed in Table 1.

TABLE 1

| Material | True Density (g/ml) | Theoretical Capacity (Ah/ml) |
|---|---|---|
| $CF_x$ | 2.70 | 2.42 |
| $Ag_2O_2$ | 7.48 | 3.24 |
| $Ag_2O$ | 7.14 | 1.65 |
| $AgV_2O_{5.5}$ | 4.34 | 1.37 |

The data in Table 1 indicate that $CF_x$, $Ag_2O_2$, $Ag_2O$, all have higher theoretical volumetric capacities than that of SVO. It has also been determined that each of the silver-containing materials listed in Table 1 can be pressed into cohesive pellets that readily adhere to a current collector without the presence of binder and conductive additives. This means that these silver-containing materials are useful as the second active material in sandwich cathode designs according to the present invention. In practice, it is extremely difficult to press electrode materials to their true density, and practical theoretical capacities are less than those listed in Table 1. Table 2 lists the practical densities and practical volumetric capacities of the above cathode materials based on experimental results.

TABLE 2

| Material | Practical Density (g/ml) | % of Theoretical True Density | Practical Capacity (Ah/ml) |
|---|---|---|---|
| $AgV_2O_{5.5}$ (94%) | 3.40* | 78.3 | 1.07 |
| $AgV_2O_{5.5}$ (100%) | 4.10 | 94.5 | 1.29 |
| $CF_x$ (91%) | 1.41* | 52.2 | 1.27 |
| $Ag_2O$ (100%) | 6.57 | 92.0 | 1.52 |
| $Ag_2O_2$ (100%) | 6.01 | 80.3 | 2.62 |

*Practical density of the active materials. The non-active materials including binders and conductive additives.

The data in Table 2 indicate that silver oxide materials provide greater discharge capacity than similar volumes of $CF_x$ and SVO materials. Pure SVO provides 21% more volumetric capacity than a cathode electrode formulation of 94% SVO, 3% PTFE binder and 3% of a conductive diluent. The capacity numbers listed in Table 2 are theoretical values based on complete reduction of each material.

Before fabrication into a sandwich electrode for incorporation into an electrochemical cell according to the present invention, the first and second cathode active materials prepared as described above are preferably mixed with a binder material such as a powdered fluoro-polymer, more preferably powdered polytetrafluoroethylene or powdered polyvinylidene flouride present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as powdered nickel, aluminum, titanium and stainless steel. The preferred cathode active mixture thus includes a powdered fluoro-polymer binder present at about 3 weight percent, a conductive diluent present at about 3 weight percent and about 94 weight percent of the cathode active material.

Cathode components for incorporation into an electrochemical cell according to the present invention may be prepared by rolling, spreading or pressing the first and second cathode active materials onto a suitable current collector selected from the group consisting of stainless steel, titanium, tantalum, platinum, gold, aluminum, cobalt nickel alloys, highly alloyed ferritic stainless steel containing molybdenum and chromium, and nickel-, chromium-, and molybdenum-containing alloys. The preferred current collector material is titanium, and most preferably the titanium cathode current collector has a thin layer of graphite/carbon paint applied thereto. Cathodes prepared as described above may be in the form of one or more plates operatively associated with at least one or more plates of anode material, or in the form of a strip wound with a corresponding strip of anode material in a structure similar to a "jellyroll".

In order to prevent internal short circuit conditions, the sandwich cathode is separated from the Group IA, IIA or IIIB anode by a suitable separator material. The separator is of electrically insulative material, and the separator material also is chemically unreactive with the anode and cathode active materials and both chemically unreactive with and insoluble in the electrolyte. In addition, the separator material has a degree of porosity sufficient to allow flow there through of the electrolyte during the electrochemical reaction of the cell. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, nonwoven glass, polypropylene, polyethylene, glass fiber materials, ceramics, polytetrafluoroethylene membrane commercially available under the designation ZITEX (Chemplast Inc.), polypropylene membrane commercially available under the designation CELGARD (Celanese Plastic Company, Inc.) and a membrane commercially available under the designation DEXIGLAS (C. H. Dexter, Div., Dexter Corp.).

The electrochemical cell of the present invention further includes a nonaqueous, ionically conductive electrolyte which serves as a medium for migration of ions between the anode and the cathode electrodes during the electrochemical reactions of the cell. The electrochemical reaction at the electrodes involves conversion of ions in atomic or molecular forms which migrate from the anode to the cathode. Thus, nonaqueous electrolytes suitable for the present invention are substantially inert to the anode and cathode materials, and they exhibit those physical properties necessary for ionic transport, namely, low viscosity, low surface tension and wettability.

A suitable electrolyte has an inorganic, ionically conductive salt dissolved in a nonaqueous solvent, and more preferably, the electrolyte includes an ionizable alkali metal salt dissolved in a mixture of aprotic organic solvents comprising a low viscosity solvent and a high permittivity solvent. The inorganic, ionically conductive salt serves as the vehicle for migration of the anode ions to intercalate or react with the cathode active materials. Preferably, the ion forming alkali metal salt is similar to the alkali metal comprising the anode.

In the case of an anode comprising lithium, the alkali metal salt of the electrolyte is a lithium based salt. Known lithium salts that are useful as a vehicle for transport of alkali metal ions from the anode to the cathode include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

Low viscosity solvents useful with the present invention include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy,2-methoxyethane (EME), ethyl methyl carbonate, methyl propyl carbonate, ethyl propyl carbonate, diethyl carbonate, dipropyl carbonate, and mixtures thereof, and high permittivity solvents include cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), N-methyl-pyrrolidinone (NMP), and mixtures thereof. In the present invention, the preferred anode is lithium metal and the preferred electrolyte is 0.8M to 1.5M $LiAsF_6$ or $LiPF_6$ dissolved in a 50:50 mixture, by volume, of propylene carbonate as the preferred high permittivity solvent and 1,2-dimethoxyethane as the preferred low viscosity solvent.

According to the present invention, $CF_x$ cathode material, which provides a relatively low power or rate capability but a relatively high energy density or volumetric capability, and SVO cathode material, which has a relatively low energy density but a relatively high rate capability, are individually pressed on opposite sides of a current collector screen, so that both materials are in direct contact with the current collector. Therefore, one exemplary cathode plate has the following configuration:

$CF_x$/current collector/SVO/current collector/$CF_x$

An important aspect of the present invention is that the low rate cathode material (in this case the $CF_x$ material) maintains direct contact with the current collector.

Another embodiment of the present invention has the low capacity/high rate material sandwiched between and in direct contact with the low rate cathode material. This cathode design has the following configuration:

$CF_x$/current collector/$CF_x$/SVO/$CF_x$/current collector/$CF_x$

Another important aspect of the present invention is that the low capacity material having the high rate capability is preferably positioned between two layers of low rate cathode material (either high or low capacities). In other words, the exemplary SVO material never directly faces the lithium anode. In addition, the high rate cathode material must be short circuited with the low rate material, either by direct contact as demonstrated above in the second example, or by parallel connection through the current collectors as in the first above illustrated embodiment.

Since $CF_x$ material has significantly higher volumetric capacity than that of SVO material, i.e., approximately 1.77 times greater, in order to optimize the final cell capacity, the amount of $CF_x$ material should be maximized and the amount of SVO material used should be minimized to the point that it is still practical in engineering and acceptable in electrochemical performance.

Further, end of service life indication is the same as that of a standard Li/SVO cell. And, it has been determined that the SVO electrode material and the $CF_x$ electrode material according to the present invention reach end of life at the same time. This is the case regardless of the use of the cell. Since both electrode materials reach end of service life at the same time, no energy capacity is wasted.

Cells of the present invention are particularly well suited for powering implantable medical devices requiring a relatively low to medium discharge rate. An exemplary device is a cardiac pacemaker. In such devices, it is important to have a reliable and predictable end-of-life (EOL) or end-of-replacement indicator (ERI) for the device. While $Li/CF_x$ cells are generally acceptable as a power source for these types of applications, this chemistry has a relatively flat or constant discharge curve until just before end of life, when it becomes somewhat steep. This makes it difficult for a medical professional to time and plan replacement surgery.

Therefore, in addition to augmenting the discharge performance of a $CF_x$ cell, the SVO component of the cathode electrode provides a predictable and familiar EOL discharge curve. In the discharge of a cathode according to the present invention, the SVO component is the power source from about 3.6 volts through the first voltage plateau at about 3.2 volts to about 2.8 volts. At about 2.8 volts, the $CF_x$ component is discharged until about 2.6 volts, at which time the $CF_x$ material is essentially depleted. Then, the SVO material is discharged again to EOL at 2.0 volts. The discharge of a Li/SVO cell at about 2.6 volts is referred to as the second voltage plateau. In this manner, the present cathode configuration provides a cell with increased safety characteristics under short circuit conditions along with a very reliable and predictable EOL indication for replacement surgery.

Other exemplary cathode configurations include providing the anode of lithium and the cathode having the configuration:

$CF_x$/current collector/SVO, with the $CF_x$ facing the lithium anode, $Ag_2O$/current collector/SVO, with the $Ag_2O$ facing the lithium anode, and $Ag_2O_2$/current collector/SVO, with the $Ag_2O_2$ facing the lithium anode.

It is appreciated that various modifications to the inventive concepts described herein may be apparent to those of ordinary skill in the art without departing from the spirit and scope of the present invention as defined by the appended claims.

What is claimed is:

1. An electrochemical cell, which comprises:
   a) an anode;
   b) a cathode of a first cathode active material of a first energy density and a first rate capability short circuited with a second cathode active material of a second energy density and a second rate capability, wherein the first energy density of the first cathode active material is less than the second energy density while the first rate capability is greater than the second rate capability of the second cathode active material and wherein the cathode further cornprises first and second current collectors with the first cathode active material sandwiched between the current collectors and with the second cathode active material contacting the first and second current collectors opposite the first cathode active material; and
   c) a nonaqueous electrolyte activating the anode and the cathode.

2. The electrochemical cell of claim 1 wherein the anode is of an alkali metal.

3. The electrochemical cell of claim 1 wherein the first cathode active material is selected from the group consisting of silver vanadium oxide, copper silver vanadium oxide, $V_2O_5$, $MnO_2$, $LiCoO_2$, $LiNiO_2$, $LiMnO_2$, $CuO_2$, $TiS_2$, $Cu_2S$, FeS, $FeS_2$, copper oxide, copper vanadium oxide, and mixtures thereof.

4. The electrochemical cell of claim 1 wherein the second cathode active material is selected from the group consisting of $CF_x$, $Ag_2O$, $Ag_2O_2$, CuF, $Ag_2CrO_4$, $MnO_2$, silver vanadium oxide (SVO), and mixture thereof, and wherein SVO and $MnO_2$ are the second cathode active material only when the first cathode active material is of a lesser energy density and a greater rate capability then they are.

5. The electrochemical cell of claim 1 wherein the cathode has the configuration: $CF_x$/first current collector/silver vanadium oxide/second current collector/$CF_x$.

6. The electrochemical cell of claim 1 wherein the cathode has the configuration: $CF_x$/first current collector/$CF_x$/silver vanadium oxide/$CF_x$/second current collector/$CF_x$.

7. An implantable medical device powered by an electrochemical cell, the electrochemical cell comprising:
   a) an anode;
   b) a cathode of a first cathode active material of a first energy density and a first rate capability short circuited with a second cathode active material of a second energy density and a second rate capability, wherein the first energy density of the first cathode active material is less than the second energy density while the first rate capability is greater than the second rate capability of the second cathode active material and wherein the cathode further comprises first and second current collectors with the first cathode active material sandwiched between the current collectors and with the second cathode active material contacting the first and second current collectors opposite the first cathode active material; and
   c) a nonaqueous electrolyte activating the anode and the cathode.

8. The electrochemical cell of claim 7 wherein the anode is of an alkali metal.

9. The electrochemical cell of claim 7 wherein the first cathode active material is selected from the group consisting of silver vanadium oxide, copper silver vanadium oxide, $V_2O_5$, $MnO_2$, $LiCoO_2$, $LiNiO_2$, $LiMnO_2$, $CuO_2$, $TiS_2$, $Cu_2S$, FeS, $FeS_2$, copper oxide, copper vanadium oxide, and mixtures thereof.

10. The clectrochemical cell of claim 7 wherein the second cathode active material is selected from the group consisting of $CF_x$, $Ag_2O$, $Ag_2O_2$, CuF, $Ag_2CrO_4$, $MnO_2$, silver vanadium oxide (SVO), and mixtures thereof, and wherein SVO and $MnO_2$ are the second cathode active material only when the first cathode active material is of a lesser energy sensity and a greater rate capability than they are.

11. The electrochemical cell of claim 7 wherein the first and second current collectors are selected from the group consisting of stainless steel, titanium, tantalum, platinum, gold, aluminum, cobalt nickel alloys, highly alloyed ferritic stainless steel containing molybdenum and chromium, and nickel-, chromium-, and molybdenum-containing alloys.

12. The electrochemical cell of claim 7 wherein the first and second current collectors are titanium having a coating selected from the group consisting of graphite/carbon material, iridium, iridium oxide, and platinum provided thereon.

13. The electrochemical cell of claim 7 wherein the anode is lithium, the first cathode active material is silver vanadium oxide, the second cathode active material is $CF_x$ and the first and second current collectors are titanium.

14. The electrochemical cell of claim 7 wherein the cathode has the configuration:

$CF_x$/first current collector/silver vanadium oxide/second current collector/$CF_x$.

15. The electrochemical cell of claim 7 wherein the cathode has the configuration:

$CF_x$/first current collector/$CF_x$/silver vanadium oxide/$CF_x$/second current collector/$CF_x$.

16. The electrochemical cell of claim 7 wherein the electrolyte has a first solvent selected from an ester, a linear ether, a cyclic ether, a dialkyl carbonate, and mixtures thereof, and a second solvent selected from a cyclic carbonate, a cyclic ester, a cyclic amide, and mixtures thereof.

17. The electrochemical cell of claim 16 wherein the first solvent is selected from the group consisting of tetrahydrofuran, methyl acetate, diglyme, trigylme, tetragylme, dimethyl carbonate, 1,2-dimethoxyethane, 1,2-diethoxyethane, 1-ethoxy,2-methoxyethane, ethyl methyl carbonate, methyl propyl carbonate, ethyl propyl carbonate, diethyl carbonate, dipropyl carbonate, and mixtures thereof, and the second solvent is selected from the group consisting of propylene carbonate, ethylene carbonate, butylene carbonate, acetonitrile, dimethyl sulfoxide, dimethyl formamide, dimethyl acetamide, γ-valerolactone, γ-butyrolactone, N-methyl-pyrrolidinone, and mixtures thereof.

18. The electrochemical cell of claim 7 wherein the electrolyte includes a lithium salt selected from the group consisting of $LiPF_6$, $LiBF_4$, $LiAsF_6$, $LiSbF_6$, $LiClO_4$, $LiO_2$, $LiAlC_4$, $LiGaCl_4$, $LiC(SO_2CF_3)_3$, $LiN(SO_2CF_3)_2$, $LiSCN$, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

19. The electrochemical cell of claim 7 wherein the electrolyte is 0.8M to 1.5M $LiAsF_6$ or $LiPF_6$ dissolved in a 50:50 mixture, by volume, of propylene carbonate and 1,2-dimethoxyethane.

20. An electrochemical cell, which comprises:
a) a lithium anode;
b) a cathode of a first cathode active material selected from the group consisting of silver vanadium oxide, copper silver vanadium oxide, $V_2O_5$, $MnO_2$, $LiCoO_2$, $LiNiO_2$, $LiNnO_2$, $CuO_2$, $TiS_2$, $Cu_2S$, $FeS$, $FeS_2$, copper oxide, copper vanadium oxide, and mixtures thereof, sandwiched between a first and second titanium current collectors with a second cathode active material selected from the group consisting of $CF_x$, $Ag_2O$, $Ag_2O_2$, $CuF$, $Ag_2CrO_4$, $MnO_2$, silver vanadium oxide (SVO), and mixtures thereof, contacting the first and second current collectors opposite the first cathode active material, and wherein SVO and $MnO_2$ are the second cathode active material only when the first cathode active material is of a lesser energy density and a greater rate capability than they are; and
c) a nonaqueous electrolyte activating the anode and the cathode.

21. A method for providing an electrochemical cell, comprising the steps of:
a) providing an anode;
b) providing a first cathode active material of a first energy density and a first rate capability;
c) providing a second cathode active material of a second energy density and a second rate capability, wherein the first energy density of the first cathode active material is less than the second energy density while the first rate capability is greater than the second rate capability of the second cathode active material;
d) providing first and second current collectors;
e) sandwiching the first cathode active material between the current collectors with the second cathode active material contacting the first and second current collectors opposite the first cathode active material to thereby provide a cathode; and
f) activating the anode and cathode with an electrolyte.

22. The method of claim 21 including providing the anode of an alkali metal.

23. The method of claim 21 including selecting the first cathode active material from the group consisting of silver vanadium oxide, copper silver vanadium oxide, $V_2O_5$, $MnO_2$, $LiCoO_2$, $LiNiO_2$, $LiMnO_2$, $CuO_2$, $TiS_2$, $Cu_2S$, $FeS$, $FeS_2$, copper oxide, copper vanadium oxide, and mixtures thereof.

24. The method of claim 21 including selecting the second cathode active material from the group consisting of $CF_x$, $Ag_2O$, $Ag_2O_2$, $CuF$, $Ag_2CrO_4$, $MnO_2$, silver vanadium oxide (SVO), and mixtures thereof, and wherein SVO and $MnO_2$ are the second cathode active material only when the first cathode active material is of a lesser energy density and a greater rate capability then they are.

25. The method of claim 21 wherein the anode is lithium, the firsst cathide active material is silver vanadium oxide (SVO), the second cathode active material is $CF_x$ and the first and second current collectors are titanium.

26. The method of claim 21 including providing the cathode having the configuration: $CF_x$/first current collector/silver vanadium oxide/second current collector/$CF_x$.

27. The method of claim 21 including providing the cathode having the configuration: $CF_x$/first current collector/$CF_x$/silver vanadium oxide/$CF_x$/second current collector/$CF_x$.

* * * * *

UNITED STATES PATENT AND TRADEMARK OFFICE
CERTIFICATE OF CORRECTION

PATENT NO. : 6,692,871 B2
DATED : February 17, 2004
INVENTOR(S) : Gan et al.

It is certified that error appears in the above-identified patent and that said Letters Patent is hereby corrected as shown below:

<u>Title page,</u>
Item [56], References Cited, U.S. PATENT DOCUMENTS,
should read -- 3,520,729 07/1970 Voss et al.
4,161,063 07/1979 Goebel et al.
4,292,357 09/1981 Erisman et al.
4,324,828 04/1982 Ebato et al.
4,409,730 10/1983 Goebel
4,439,916 04/1984 Faber
5,180,642 01/1993 Weiss et al.
5,571,636 11/1996 Ohta et al.
5,582,935 12/1996 Dasgupta et al.
5,639,568 06/1997 Pedicini et al.
5,658,694 08/1997 Charkey
5,667,916 09/1997 Ebel et al. --
also insert
-- 5,670,276 09/1997 Takeuchi et al.
5,716,422 02/1998 Muffoletto et al.
5,744,258 04/1998 Bai et al.
5,863,676 01/1999 Charkey et al.
5,993,999 11/1999 Rivers et al. --

Signed and Sealed this

Fifteenth Day of June, 2004

JON W. DUDAS
*Acting Director of the United States Patent and Trademark Office*